UNITED STATES PATENT OFFICE.

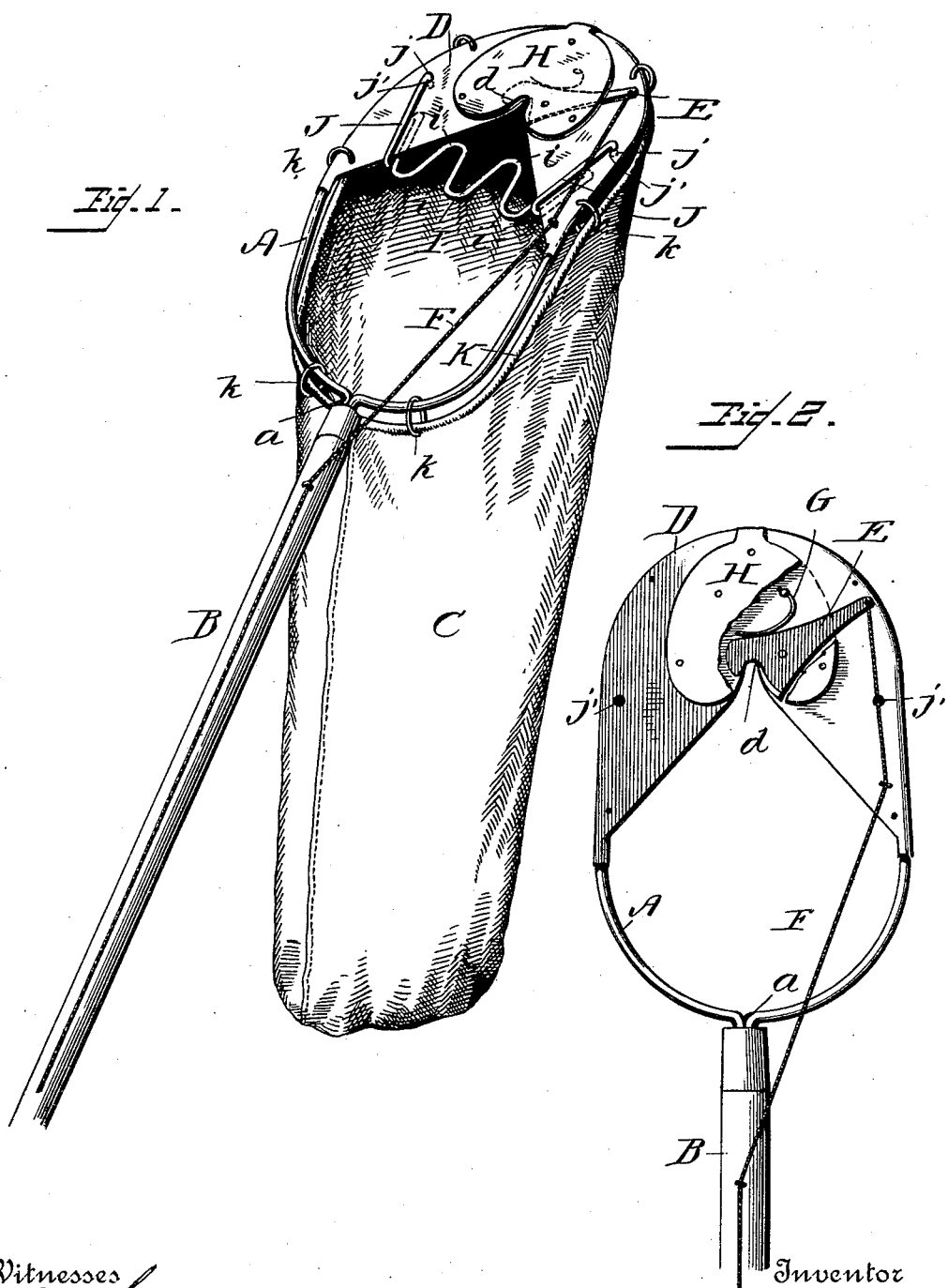

OLIVER PERRY SMITH, OF FOLK, OHIO.

FRUIT-PICKER.

SPECIFICATION forming part of Letters Patent No. 459,660, dated September 15, 1891.

Application filed May 21, 1891. Serial No. 393,623. (No model.)

*To all whom it may concern:*

Be it known that I, OLIVER PERRY SMITH, a citizen of the United States, residing at Folk, in the county of Harrison and State of Ohio, have invented certain new and useful Improvements in Fruit-Pickers; and I do hereby declare the following to be a full, clear, and exact description of the invention, such as will enable others skilled in the art to which it appertains to make and use the same.

This invention relates to fruit-pickers, and aims to provide a picker which will facilitate the gathering of fruit and which can be used to cut the stems or detach the fruit without cutting.

The improvement consists of the novel features, which will be hereinafter more fully described and claimed, and which are shown in the annexed drawings, in which—

Figure 1 is a perspective view of the invention. Fig. 2 is a front view of the picker-head, the wire picker being detached.

The frame A is oblong, and is deflected midway of its ends to throw the upper portion back at an incline to facilitate the entrance of the fruit into the mouth of the sack C, which is secured to the frame A. The ends of the wire which comprise the frame are brought together and twisted to form the tongue $a$, which is let into the pole B and connects the frame and the pole together. The upper portion of the frame is provided with the metal plate D, which has its lower edge sloping in opposite directions to the notch $d$. The cutter E is pivoted between its ends to the plate D and is operated from the ground by the cord F, which is attached to its outer end. The inner lower end of the cutter conforms to a side of the notch $d$ and is sharpened. The spring G serves to return the cutter to a normal position. The plate H, secured to the plate D, protects the cutter and the spring G from injury and has a notch corresponding with the notch $d$ in the plate D. The cutter, working between the plates H and D, which support the stem on each side thereof, severs the said stem with ease, in that it is held at right angles to the plane of motion of the said cutter.

The wire picker I comprises a series of folds $i$ between its ends and spring-clamps J at its ends, which embrace the plate D. The bent ends $j$ of the wire enter openings $j'$ in the plate D and retain the picker I in place against accidental displacement. This picker is placed in position on the plate D only when the fruit can be readily detached without cutting.

The sack C is secured to a wire frame K, which conforms to the shape of the frame A and which is secured to frame A by rings $k$. The operating-cord passes through suitable keepers or guides on the plate D and the pole B and extends within convenient reach to be pulled upon when it is desired to operate the cutter.

Having thus described my invention, what I claim, and desire to secure by Letters Patent, is—

1. In a fruit-picker, the combination, with the frame A and the plate D, of the wire picker comprising folds between its ends and a metal clamp at each end to embrace the plate D, and having its ends bent and adapted to enter openings in the said plate, substantially as described.

2. A fruit-picker comprising frame A, which is deflected between its ends, plate D, secured to the upper portion of frame A and having notch $d$ and sloping edges, the cutter E, pivoted to the plate, the spring G, the plate H, secured to the plate D and covering the cutter and the spring, the operating-cord F, the pole B, the sack C, and the frame K, secured to the sack and fastened to the frame A by rings, substantially as described.

In testimony whereof I affix my signature in presence of two witnesses.

OLIVER PERRY SMITH.

Witnesses:
 FOARD LONG,
 JAMES T. POWELL.